United States Patent
Suda

(10) Patent No.: US 7,342,949 B2
(45) Date of Patent: Mar. 11, 2008

(54) LASER SCANNING DEVICE

(75) Inventor: Tadaaki Suda, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 260 days.

(21) Appl. No.: 10/686,648

(22) Filed: Oct. 17, 2003

(65) Prior Publication Data

US 2004/0079872 A1   Apr. 29, 2004

(30) Foreign Application Priority Data

Oct. 21, 2002   (JP) .............................. 2002-305892

(51) Int. Cl.
*H01S 3/13*   (2006.01)
*H01S 3/00*   (2006.01)
*B41J 2/435*   (2006.01)

(52) U.S. Cl. .............................. 372/38.09; 372/29.011; 347/246; 347/247

(58) Field of Classification Search ............. 372/38.08, 372/38.09, 29.011; 347/246, 247
See application file for complete search history.

(56) References Cited

U.S. PATENT DOCUMENTS

| | | | | |
|---|---|---|---|---|
| 4,845,720 A | * | 7/1989 | Koishi et al. ............... | 372/31 |
| 5,163,063 A | * | 11/1992 | Yoshikawa et al. ....... | 372/38.02 |
| 5,309,461 A | * | 5/1994 | Call et al. ................. | 372/38.09 |
| 5,418,806 A | * | 5/1995 | Araki ...................... | 372/29.015 |
| 5,646,763 A | * | 7/1997 | Misaizu et al. ............. | 398/197 |
| 6,061,373 A | * | 5/2000 | Brockman et al. ........ | 372/38.06 |
| 6,246,705 B1 | | 6/2001 | Kasai | |
| 6,350,978 B1 | | 2/2002 | Kasai | |
| 6,566,641 B1 | * | 5/2003 | Suda ........................ | 250/205 |
| 2005/0093969 A1 | * | 5/2005 | Takesue ................... | 347/240 |

FOREIGN PATENT DOCUMENTS

| | | |
|---|---|---|
| JP | 2545533 | 5/1997 |
| JP | 11-42814 | 2/1999 |
| JP | 2001-257729 | 9/2001 |

OTHER PUBLICATIONS

Patents Abstracts of JP11-042814.

* cited by examiner

*Primary Examiner*—Minsun Harvey
*Assistant Examiner*—Marcia A. Golub
(74) *Attorney, Agent, or Firm*—Greenblum & Bernstein, P.L.C.

(57) ABSTRACT

A laser scanning device includes a semiconductor laser that emits a laser beam, a laser power detector that detects laser beam power of the semiconductor laser, a reference voltage generator that generates reference voltage for controlling the laser beam power of the semiconductor laser in accordance with a laser power control signal provided from an external device, and a laser driver that compares the reference voltage generated by the reference voltage generator and the laser beam power detected by the laser power detector to control a driving current supplied to the semiconductor laser for emitting the laser beam. The laser scanning device further includes an abnormal condition detector that detects the laser power control signal received by the reference voltage generator. When the detected laser power control signal differs from a predetermined signal, which indicates that the connection between the reference voltage generator and the external device is poor, the abnormal condition detector stops the laser driver from operating.

14 Claims, 8 Drawing Sheets

LASER SCANNING DEVICE

BACKGROUND OF THE INVENTION

The present invention relates to a laser scanning device that forms images by scanning a laser beam, and more particularly to a laser scanning device of which laser beam power is adjustable.

A laser scanning device forms an image on a photoconductive drum by scanning thereon a laser beam that is emitted from a laser source such as a semiconductor laser. If a gray-scale black and white image or a color image is to be produced, the laser scanning device is required to control the power of the laser beam in accordance with the shades of gray or the color to be printed. In order to achieve the above, the laser scanning device is provided with a laser power control circuitry which controls the power of the laser beam in accordance with a laser power control signal provided from an external device.

FIG. 1 is a block diagram of an exemplary laser power control circuitry 1000 utilized in a conventional laser scanning device. The laser power control circuitry 1000 is connected to a semiconductor laser LD such as a laser diode, and a photo-diode MPD for monitoring the power of the laser beam emitted from the semiconductor laser LD. The laser power control circuitry 1000 includes a laser driving circuitry 1010 that controls the laser beam emission of the semiconductor laser LD. The laser driving circuitry 1010 is arranged to receive a video signal to control the ON/OFF of the semiconductor laser LD in accordance therewith. The laser driving circuitry 1010 supplies a driving current Id to the semiconductor laser LD so that the semiconductor laser LD emits the laser beam. The laser driving circuitry 1010 controls the amount of the driving current Id in accordance with a reference voltage Vref provided from a reference voltage controller 1020. The reference voltage controller 1020 generates the reference voltage Vref in accordance with a laser power control signal provided from an external device.

The external device providing the laser power control signal may be, if the laser power control circuitry 1000 is applied to a laser printer, a print engine of the laser printer. The laser power control signal is, for example, a parallel four bits digital signal D3-D0, which is provided to the reference voltage controller 1020 through four input terminals Td3-Td0 that are pulled up to a source voltage Vcc by respective pull-up resistors R. The reference voltage controller 1020 generates the reference voltage Vref, for example, by converting the digital laser power control signal into an analog signal and outputs the same to the laser driving circuitry 1010. The laser driving circuitry 1010 controls the driving current Id supplied to the semiconductor laser LD based on the reference voltage Vref.

The semiconductor laser LD supplied with the driving current Id emits the laser beam, and the power of this laser beam is detected by the photo-diode MPD. The photo-diode MPD outputs a laser power detection current Ir corresponding to the detected laser beam power to the laser driving circuitry 1010. The laser power detection current Ir is converted into a laser power detection voltage Vr within the laser driving circuitry 1010. The laser driving circuitry 1010 compares the laser power detection voltage Vr and the reference voltage Vref and adjusts the driving current Id supplied to the semiconductor laser LD so that laser power detection voltage Vr and the reference voltage Vref indicates a predetermined relation, for example, coinciding with each other.

The laser driving circuitry 1010 is further provided with a variable resistor VR for varying the rate of converting the laser power detection current Ir into the laser power detection voltage Vr. By properly adjusting the variable resistor VR, the power of the laser beam emitted from the semiconductor laser LD corresponds properly to the reference voltage Vref, or the laser power control signal provided from the external device.

In the laser scanning device provided with the laser power control circuitry 1000, the reference voltage Vref for controlling the driving current Id of the semiconductor laser LD is generated from the laser power control signal provided from the external device.

An adjustment to the laser power control circuitry 1000 is carried out in the following manner. First, the laser power control circuitry 1000 is connected with an external adjustment device that provides a standard laser power control signal to the reference voltage controller 1020. The reference voltage controller 1020 generates a reference voltage Vref corresponding to the standard laser power control signal. Next, the laser driving circuitry 1010 provides a driving current Id corresponding to that reference voltage Vref to the semiconductor laser LD. As a result, the semiconductor laser LD emits a laser beam. The power of the laser beam is adjusted so as to correspond to the standard laser power control signal by operating the variable resistor VR.

It should be noted, however, that if the laser power control circuitry 1000 is (or the data input terminals Td3-Td0 thereof are) poorly connected with the external adjustment device or with a signal bus connecting the laser power control circuitry 1000 and the external adjustment device, the laser power control circuitry 1000 receives the laser power control signal erroneously, and hence generates the reference voltage Vref and controls the driving current Id based on that erroneous laser power control signal.

Assume, for example, that a laser power control signal indicating a maximum value "1111" is provided to the reference voltage controller 20 through the data input terminals Td3-Td0, and the variable resistor VR is adjusted so that the semiconductor laser LD outputs the maximum power thereof. If one of the data input terminals, for example, the data input terminal for the most significant bit (MSB), Td3, is poorly connected with external adjustment device, the laser power control circuitry 1000, or the reference voltage controller 1020, receives an erroneous data "0111". In this case, the laser power control circuit 1000 is adjusted to control the semiconductor laser LD to output the maximum power although the provided laser power control signal is not the maximum value thereof.

If the laser scanning device of which laser power control device 1000 is adjusted as above is provided in a laser beam printer, and if a laser power control signal having the maximum value "1111" is inputted to the laser power control device 1000, the semiconductor laser LD is supplied with a driving current Id exceeding the maximum allowable driving current (in the current case, with a driving current twice as large as the maximum allowable driving current). As a result, the semiconductor laser LD outputs excessive power, which may accelerate the deterioration and/or cause fatal damage to the semiconductor laser LD.

Therefore, there is a need for a laser scanning device by which the laser beam power can be adjusted correctly and reliably.

SUMMARY OF THE INVENTION

The present invention is advantageous in that a laser scanning device is provided that satisfies the above mentioned needs.

A laser scanning device according to an aspect of the invention includes a semiconductor laser that emits a laser beam, a laser power detector that detects laser beam power of the semiconductor laser, a reference voltage generator that generates reference voltage for controlling the laser beam power of the semiconductor laser in accordance with a laser power control signal provided from an external device, and a laser driver that compares the reference voltage generated by the reference voltage generator and the laser beam power detected by the laser power detector to control a driving current supplied to the semiconductor laser for emitting the laser beam. The laser scanning device further includes an abnormal condition detector that detects the laser power control signal received by the reference voltage generator. When the detected laser power control signal differs from a predetermined signal, which indicates that the connection between the reference voltage generator and the external device is poor, the abnormal condition detector stops the laser driver from operating. Accordingly, the laser scanning device does not emit the laser beam when it is poorly connected to the external device, and there is no danger that the power of the laser beam is adjusted improperly based on the laser power control signal that is erroneously received by the laser scanning device.

Optionally, the laser driver may have a manually operable adjuster for adjusting the driving current of the semiconductor laser so as to correspond to the laser power control signal.

Optionally, the reference voltage generator may have an input terminal that is kept at a first voltage level when no laser power control signal is provided thereto. In this case, the abnormal condition detector may be arranged to as to output a laser driver disable signal to the laser driver to stop operation thereof when the input terminal remains at the first voltage level although the laser power control signal inputted thereto has a second voltage level different from the first voltage level. Note that the first voltage level may be a high voltage and the second voltage level may be a low voltage lower than the first voltage level.

Alternatively, the reference voltage generator may have a plurality of input terminals each of which is kept at a first voltage level when no laser power control signal is provided thereto. In this case, the abnormal condition detector may be arranged to output a laser driver disable signal to the laser driver to stop operation thereof when at least one of the input terminals remains at the first voltage level although the laser power control signal inputted thereto has the second voltage level.

Optionally, the laser power control signal may be a parallel digital signal.

Optionally, the abnormal condition detector may include an abnormal condition signal generator that generates an abnormal condition signal when at least one of the input terminals remains at the first voltage level although the laser power control signal inputted thereto has the second voltage level, and a laser driver controller that outputs the laser driver disable signal to the laser driver when the abnormal condition signal generator outputs the abnormal condition signal.

Further optionally, the abnormal condition signal generator may be composed of an AND gate having inputs of which number is not less than a number of the input terminals of the reference voltage generator. Alternatively, the abnormal condition signal generator may be composed of a plurality of open collector inverters, which inputs are connected with respective ones of the input terminals and outputs are connected with each other to form a single output.

Optionally, the laser driver controller may be a flip flop that changes a state of an output thereof to generate the laser driver disable signal.

A laser scanning device according to another aspect of the invention includes a laser source that emits a laser beam to be scanned on an object, a connector having at least one input terminal connectable to an external device for receiving a control signal, a laser source controller that controls power of the laser beam emitted from the laser source in accordance with the control signal received through the input terminal, and a detector that examines the connection between the input terminal and the external device. The detector disables the laser source from emitting the laser beam when a poor connection between the input terminal and the external device is detected. Accordingly, an operator can confirm whether the connection between the input terminal and the external device is poor or not by checking the laser emission of the laser source. Further, since the laser source does not emit the laser beam, the power of the laser beam will be not adjusted based on an erroneous control signal received by said laser scanning device through the input terminal being poorly connected with the external device.

A laser scanning device according to still another aspect of the invention includes a laser source that emits a laser beam to be scanned on an object, an input terminal connectable to an external device for receiving a control signal, a laser source controller that controls power of the laser beam emitted from the laser source in accordance with the control signal received through the input terminal, the laser source controller having an adjuster that adjusts the relation between the power of the laser beam and the control signal received, and a detector that examines the connection between the input terminal and the external device and disables the adjuster from operating when a poor connection between the input terminal and the external device is detected. In the laser scanning device arranged as above, the power of the laser beam is prevented from being adjusted based on an erroneous control signal received by the laser source controller through a poor connection between the input terminal and the external device.

BRIEF DESCRIPTION OF THE ACCOMPANYING DRAWINGS

FIG. 1 is a block diagram of an exemplary laser power control circuitry utilized in a conventional laser scanning device;

FIG. 2 schematically shows a configuration of a laser scanning device according to an embodiment of the invention;

DETAILED DESCRIPTION OF THE EMBODIMENTS

Hereinafter, an embodiment of the present invention will be described with reference to the accompanying drawings.

Figure 1:
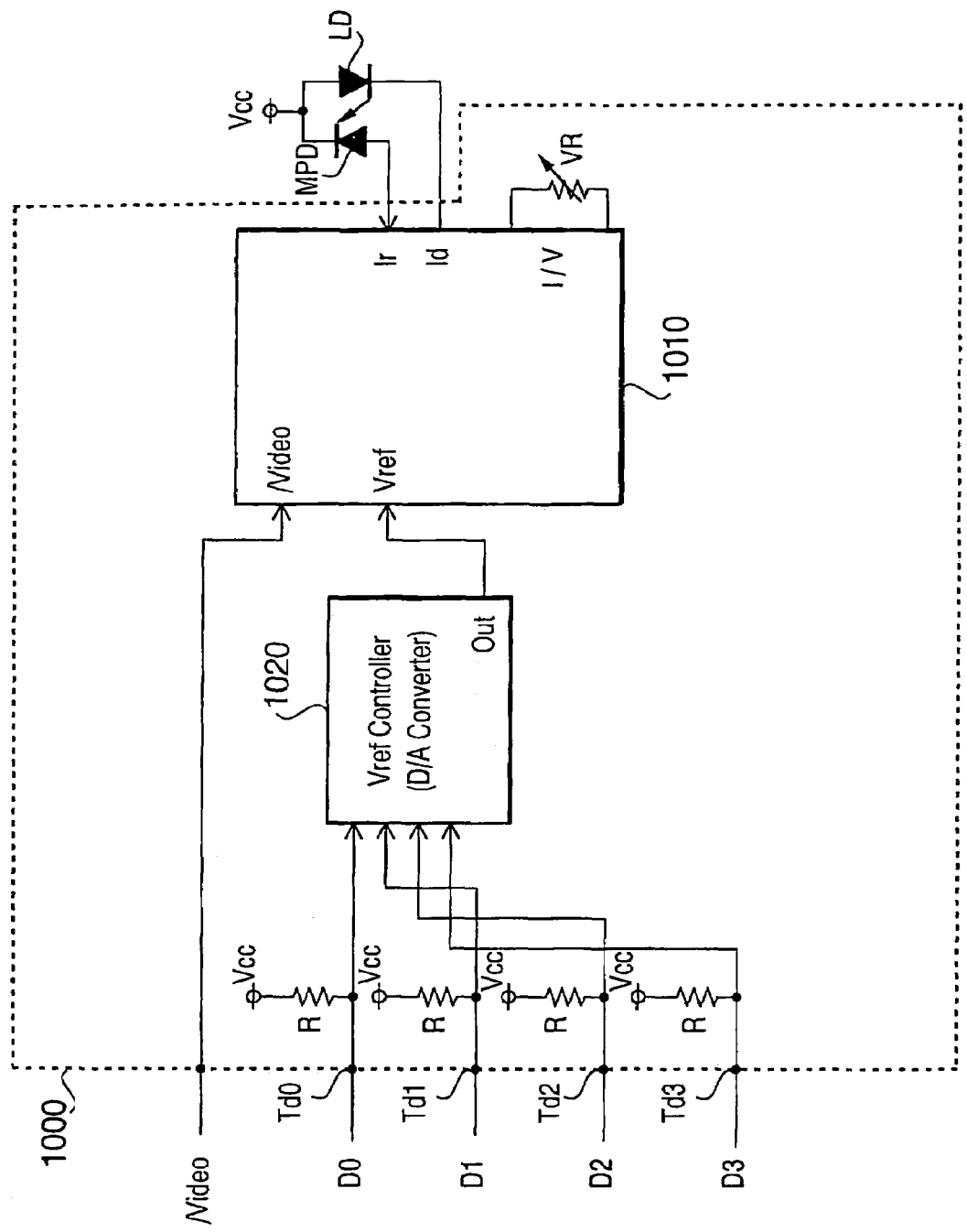
Figure 2:
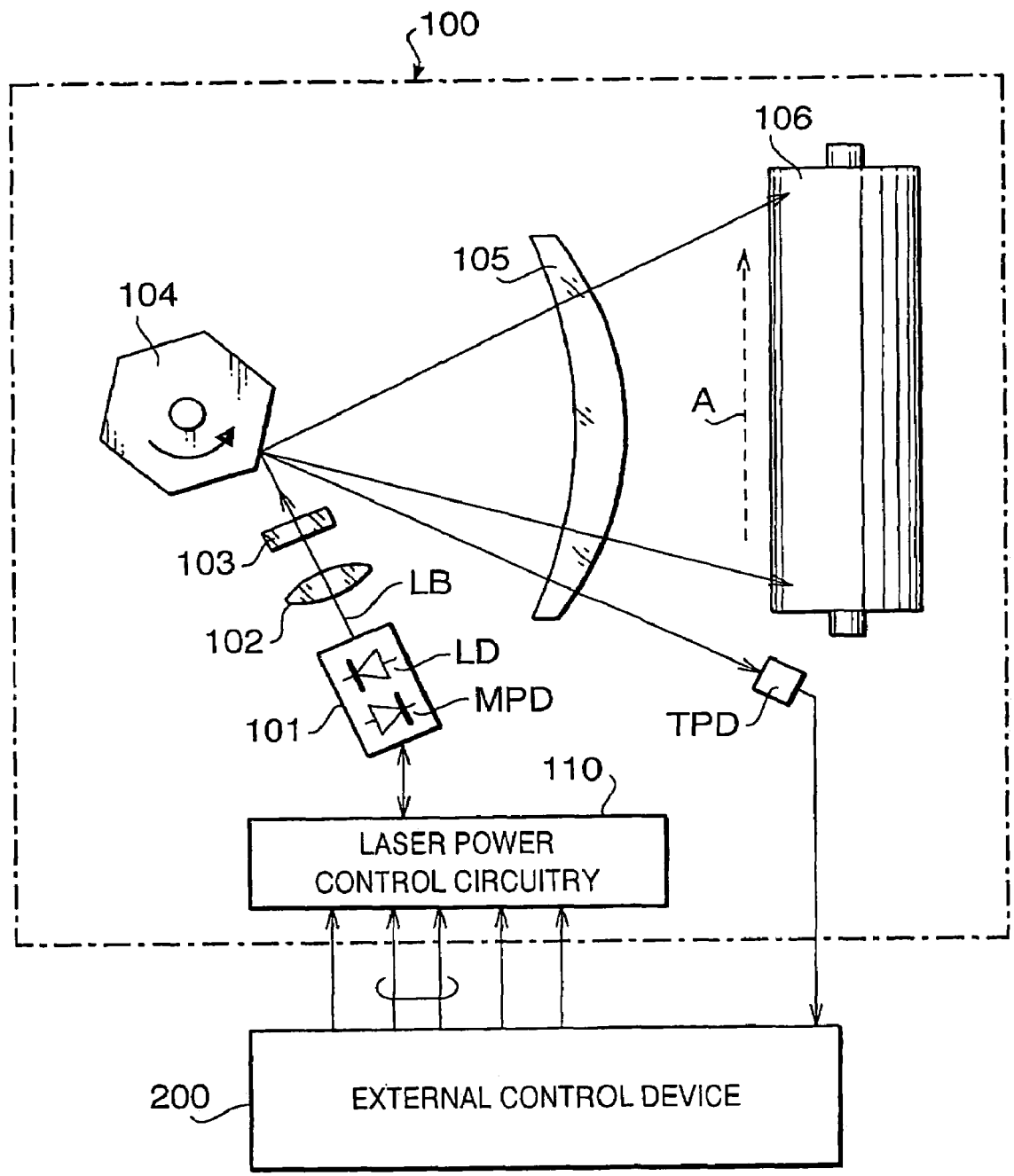

FIG. 2 schematically shows a configuration of a laser scanning device 100 according to an embodiment of the invention. The laser scanning device 100 is provided with a semiconductor laser LD, a collimator lens 102, a cylindrical lens 103, a polygonal mirror 104, an fθ lens system 105, and a photoconductive drum 106. A laser beam emitted from the semiconductor laser LD is collimated by the collimator lens 102 and then converged only in an auxiliary scanning direction, which is a direction parallel to a rotation axis of the polygon mirror 104. The converged laser beam is further deflected by the polygonal mirror 104 so as to pass through the fθ lens system 105 and scan on the photoconductive drum 106 in a main scanning direction, which is indicated by an arrow A. Note that the fθ lens system 105 is designed so that the laser beam passed therethrough scans on the photoconductive drum 106 at a constant speed if the polygonal mirror 104 is rotated at a constant revolving speed.

The laser scanning device 100 is further provided with a photo diode MPD for detecting the power of the laser beam emitted from the semiconductor laser LD in the present embodiment, the semiconductor laser LD and photo diode MPD are integrated in a single package 101.

The laser scanning device 100 is also provided with a photo diode TPD that outputs a signal whenever it receives the laser beam deflected by the polygonal mirror 104. The output signal of the photo diode TPD is transmitted to an external control device 200 connected to the laser scanning device 100. The external control device 200 generates a horizontal synchronization signal and an automatic power control (APC) timing signal (/Adjust) based on the output signal of photo diode TPD. The horizontal synchronization signal determines the timing of forming an image on the photoconductive drum 106 with the laser beam. The APC timing signal (/Adjust) determines the timing of adjusting the power of the laser beam emitted by the semiconductor laser LD.

The laser scanning device 100 further includes a laser power control circuitry 110. The laser power control circuitry 110 controls the laser power of the semiconductor laser LD in accordance with a laser power control signal provided from the external control device 200. The laser power control circuitry 110 also turns on/off the semiconductor laser LD, to form an image on the photoconductive drum 106, in accordance with a video signal provided from the external control device 200.

Figure 3:
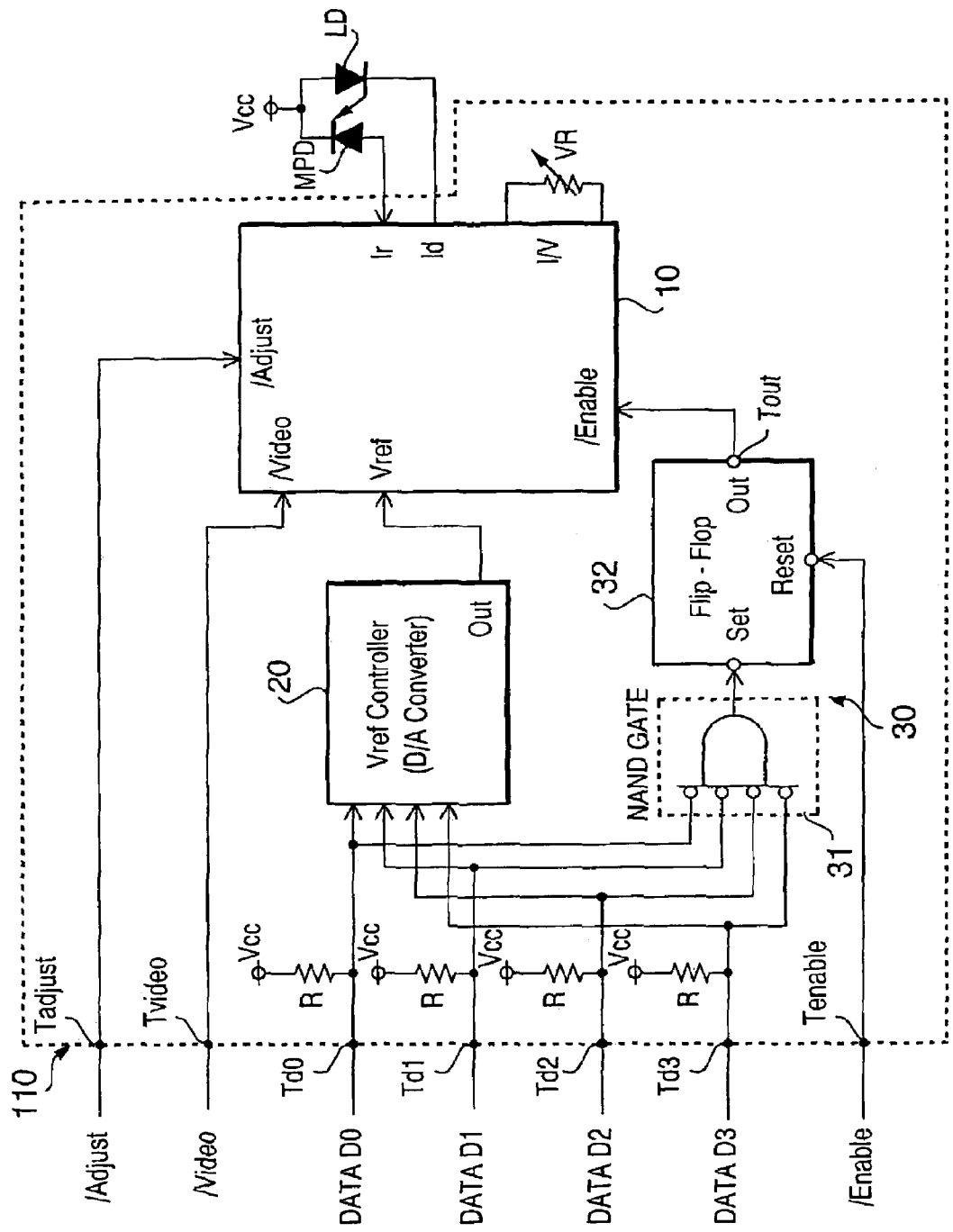
FIG. 3 is a block diagram of a laser power control circuitry of the laser scanning device shown in FIG. 2.

FIG. 3 is a block diagram of the laser power control circuitry 110 of the laser scanning device 100 shown in FIG. 2. The laser power control circuitry 110 includes a laser driving circuitry 10, a reference voltage controller 20, and an abnormal control signal detecting circuitry 30. The laser driving circuitry 10 controls the power of the laser emitted from the semiconductor laser LD in accordance with a reference voltage Vref generated by the reference voltage controller 20. The reference voltage controller 20 generates the reference voltage Vref based on the laser power control signal provided from the external control circuitry 200. The abnormal control signal detecting circuitry 30 is arranged to determine whether the laser power control signal provided to the reference voltage controller 20 is normal or abnormal.

The reference voltage controller 20 is connected with four data input terminals Td0, Td1, Td2, and Td3 for receiving the laser power control signal which is composed of four digital bits D0, D1, D2, and D3. Each of the data input terminals Td3-Td0 is connected with a pull-up resistor R that pulls the terminal up to a source voltage Vcc. Each data input terminal Td3-Td0 takes a low level "L" such as a ground level when "0" is provided thereto as a laser power control signal.

The laser driving circuitry 10 is connected with an APC timing terminal (Tadjust) and a video terminal (Tvideo) of the laser power control circuitry 110. The laser driving circuitry 10 receives a timing signal (/Adjust) for the automatic power control (APC) through the APC timing terminal (Tadjust). Note that the APC timing signal is generated in such timing that the automatic power control, or power adjustment, of the laser beam emitted from the semiconductor laser LD is carried out when the laser beam is not forming an image on the photo-conductive drum 106.

Further, the laser driving circuitry 10 receives the video signal through the video terminal (Tvideo) for controlling the laser beam on/off to form an image on the photo-conductive drum.

The laser driving circuitry 10 is also connected with an enable terminal (Tenable) for receiving an enable signal that stops the operation of laser driving circuitry 10 or stops the laser driving circuitry 10 from providing driving current to the semiconductor laser LD.

Figure 4:
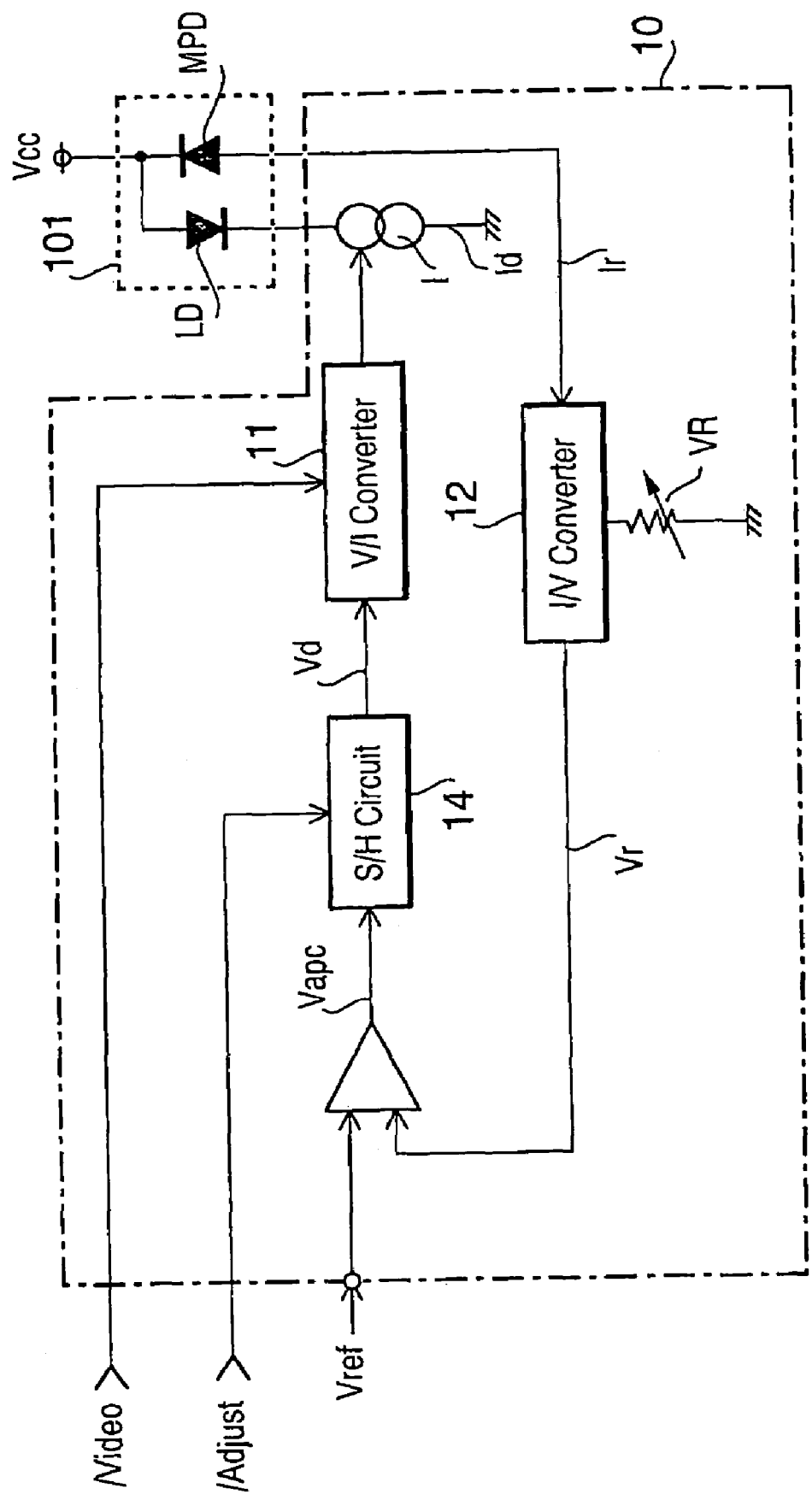
FIG. 4 is a block diagram showing a configuration of a laser driving circuitry 10 of the laser power control circuitry shown in FIG. 3.

FIG. 4 is a block diagram showing the configuration of the laser driving circuitry 10, which serves as an automatic power control (APC) circuitry. The laser driving circuitry 10 includes a current source I, a voltage-to-current (V/I) converter 11, a current-to-voltage (I/V) converter 12, a comparator 13, and a sample-hold (S/H) circuit 14.

The current source I is connected to the semiconductor laser LD to provide a driving current Id thereto. The V/I converter 11 controls the current source I, or the driving current Id, in accordance with a driving voltage Vd generated by the sample-hold circuit 14.

As the driving current Id is provided, the semiconductor laser Ld emits the laser beam. The photo diode MPD detects the power of that laser beam and outputs a laser power detection current Ir to the I/V converter 12. The I/V converter 12 converts the laser power detection current Ir into a laser power detection voltage Vr and outputs it to the comparator 13. The comparator 13 compares the laser power detection voltage Vr with the reference voltage Vref provided from the reference voltage controller 20 and generates an automatic power control (APC) voltage Vapc in accordance with the difference therebetween. The APC voltage Vapc is then provided to the sample-hold circuit 14. The sample-hold circuit 14 samples the APC voltage Vapc when it receives the APC timing signal (/Adjust) from the external control device 200 and holds the APC voltage when the APC timing signal is cleared to output it as the driving voltage Vd to the V/I converter 11.

It should be noted that the I/V converter 12 is provided with a variable resistor VR for adjusting the rate of converting the laser power detection current Ir to the laser power detection voltage Vr. By operating the variable resistor VR, the laser power detection voltage Vr can be changed against the laser power detection current Ir or the laser power detected by the photo-diode MPD. The change in the laser power detection voltage Vr causes, in turn, changes in the APC voltage Vapc, the driving voltage Vd, the driving current Id, and ultimately the power of the laser emitted by the semiconductor laser LD. Thus, the power of the laser beam emitted by the semiconductor laser LD can be adjusted by operating the variable resistor VR.

It should be also noted that the V/I converter 11 is provided with the video signal (/Video). The V/I converter 11 operates ON/OFF in accordance with the video signal (/Video) and thereby controls the beam emitting timing of the semiconductor laser LD. In this way, a desired image is formed on the photoconductive drum 106.

Referring back to FIG. 3, the reference voltage controller 20 is a digital-to-analog (D/A) converter that generates an analog signal in accordance with the inputted four bits digital data (D3-D0). In the present embodiment, the reference voltage controller 20 outputs the lowest reference voltage Vrefmin when the inputted digital data (D3-D0) is "0000". On the contrary, the reference voltage controller 20 outputs the highest reference voltage Vrefmax when the digital data (D3-D0) is "1111". If the digital data (D3-D0) indicates a value between "0000" and "1111", the reference voltage controller 20 outputs an analog signal corresponding to that digital data, of which a voltage is between the highest and lowest reference voltages Vrefmax and Vrefmin.

The abnormal control signal detecting circuitry 30 includes a four input NAND gate 31 of which inputs are connected with respective data input terminals Td0, Td1, Td2, and Td3. The abnormal control signal circuitry 30 further includes a flip-flop 32 of which Set input is connected with the output of the four input NAND gate 31 while the Reset input thereof is connected with the enable terminal (Tenable).

Figure 5:
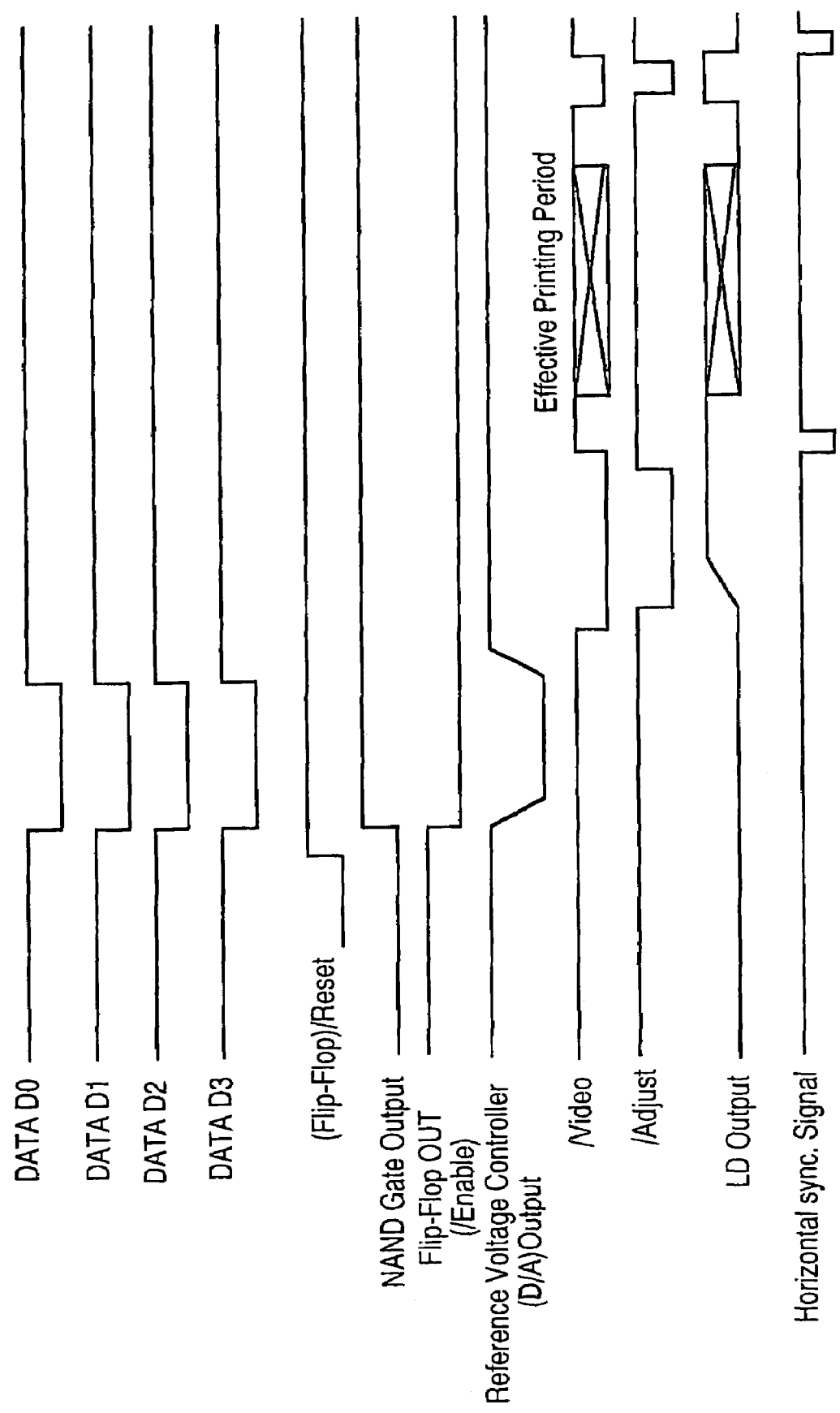
FIGS. 5 and 6 are a timing chart and a flow chart, respectively, illustrating the operation of the laser scanning device shown in FIG. 1.
Figure 6:
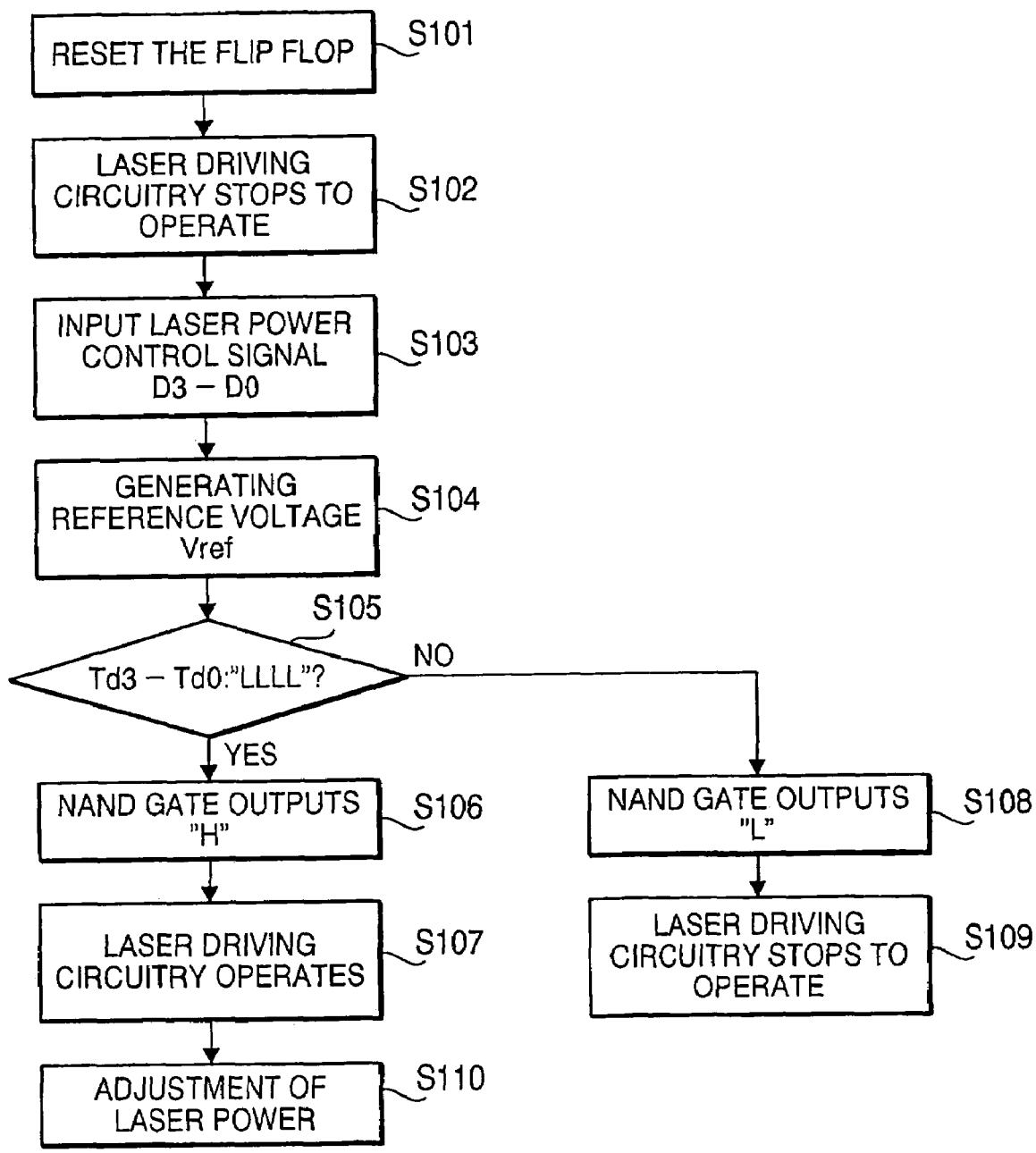

Hereinafter, the operation of the laser scanning device 100 will be described with reference to FIGS. 5 and 6, which are a timing chart and a flow chart, respectively, illustrating the operation of the laser scanning device 100.

First, the external control device 200 is connected to the laser scanning device 100 in order to adjust the reference voltage Vref. The external control device 200 first outputs the enable signal (/Enable) to the laser scanning device 100, or to the abnormal control signal detecting circuitry 30, to reset the flip-flop 32 (S101). As a result, the flip-flop 32 outputs a high level signal "H" to the enable signal input of the laser driving circuitry 10 so as to stop the laser driving circuitry 10 from operating (S102).

Next the external control device 200 transmits a four bits digital data "0000" as the laser power control signal (D3-D0) to the data input terminals Td3-Td0 (S103). The reference voltage controller 20 converts the laser power control signal (D3-D0) into an analog signal to generate the reference voltage Vref (S104).

Since the current laser power control signal (D3-D0) is "0000", all data input terminals (Td3-Td0) indicate low states, "LLLL", if the data input terminals Td3-Td0 are properly connected to the external control device 200 (S105: Y). In this case, the reference voltage controller outputs the lowest reference voltage Vrefmin to the laser drive circuitry 10. Further, since the data input terminals Td3-Td0 are also connected to the inputs of the four input NAND gate 31, the NAND gate 31 outputs a high level signal "H" to the Set input of the flip-flop 32 (S106). As a result, the flip-flop 32 outputs a low level signal "L" to the enable input of the laser driving circuitry 10 and thus the laser driving circuitry 10 starts to operate (S107).

If one or more of the data input terminals Td3-Td0 are not properly connected with the external control device 200, neither of the reference voltage controller 20 and the abnormal control signal detecting circuitry 30 can receive the correct laser power control signal (D3-D0). For example, if the data input terminal D3 is poorly connected with the external control device 200, the voltage of the data input terminal D3 is kept at the high level "H" by the pull-up resistor R. Thus, the reference voltage controller 20 receives incorrect laser power control signal "1000" (S105: N) and generates a reference voltage Vref higher than the lowest reference voltage Vrefmin.

In the meantime, the abnormal control signal detecting circuitry 30 also receives the incorrect laser power control signal "1000", or "HLLL" (S105: N). Thus, the NAND gate 31 outputs a low level signal "L" to the Set input of the flip-flop 32 (S108), which allows the flip-flop 32 to keep outputting the high level signal "H" to the enable input of the laser driving circuitry 10. As a result, the laser driving circuitry 10 is prevented from operating, and hence from adjusting the driving current Id based on incorrect reference voltage Vref (S109).

It should be noted that the poor connections between the data input terminals Td3-Td0 and the external control device 200 can be visibility checked by providing the laser scanning device 100 with the laser power control signal "0000" for a quite short time, since no driving current Id is supplied to the semiconductor laser LD and the semiconductor laser LD does not emit the laser if the connections are poor.

After the operation of the laser driving circuitry 110 is initiated at S107, the adjustment of the laser power of the semiconductor laser LD is carried out in the following manner (S110). First, the external control device 200 inputs predetermined adjustment data to the data input terminals Td3-Td0 as the laser power control signal. As a result, the reference voltage controller 20 outputs a reference voltage Vref, which corresponds to the adjustment data, to the laser driving circuitry 10.

In the laser driving circuitry 10, the reference voltage Vref is provided to the comparator 13. The comparator 13 compares the reference voltage Vref with the laser power detecting voltage Vr from the I/V converter 12 and outputs the APC voltage Vapc corresponding to the difference therebetween to the sample hold circuit 14.

The sample hold circuit 14 samples the APC voltage Vapc whenever it receives the APC timing signal (/Adjust) from the external control device 200 and holds the same as the driving voltage Vd until receiving the subsequent APC timing signal (/Adjust).

The V/I converter 11 receives the driving voltage Vd from the sample hold circuit 14 and controls the driving current Id supplied from the current source I to semiconductor laser LD in accordance therewith.

The power of the laser beam emitted by the semiconductor laser LD is detected by the photo diode MPD. The laser power detection current Ir that is generated by the photo diode MPD in accordance with the detected laser power is converted to the laser power detection voltage Vr by the I/V converter 12 and provided to the comparator 13. Thus, the comparator 13 can compare the laser power detecting voltage Vr with the reference voltage Vref and output an APC Voltage Vapc for controlling the semiconductor laser LD to emit a laser beam having a power corresponding to the reference voltage Vref.

The V/I converter 11 is operated ON/OFF by the video signal (/video) that is provided to the V/I converter 11 in synchronization with the horizontal synchronization signal. When the V/I converter 11 is ON, the semiconductor laser LD is supplied with the driving current Id, of which amount corresponds to the APC voltage Vapc, and emits the laser beam. On the contrary, if the V/I converter 11 is OFF, driving current Id is not supplied to the semiconductor laser LD, and hence the laser beam will not be emitted. Thus, the semiconductor laser LD emits intermittently the laser beam in accordance with the video signal. Since the laser beam is also scanned across the photo-conductive drum 106 by the polygonal mirror 104, the intermittently emitted laser beam forms a plurality of dots and thus a desired image on the photo-conductive drum.

It should be noted that the shades of gray or the color of the image formed on the photo-conductive drum depends on the power of the laser beam, or the APC voltage Vapc. The APC voltage Vapc, which corresponds to the difference between the reference voltage Vref and the laser power detection voltage Vr, varies with the laser power detection voltage Vr and hence can be adjusted by operating the variable resistor VR, serving as a manually operable adjuster connected to the I/V converter 12. Thus, the shades of gray or color of the image formed on the photo-conductive drum 106 can be also adjusted so as to properly correspond to the reference voltage Vref by operating the variable resistor VR.

As described above, in the laser scanning device 100 according to the present embodiment, the proper connection of the data input terminals Td3-Td0 to the external control device 200 can be confirmed by detecting that the data input terminals Td3-Td0 are all at their low level, "LLLL", when data "0000" is provided to the data input terminals Td3-Td0. Accordingly, adjustment of the laser power of the semiconductor laser LD with poor connection between the data input terminals Td3-Td0 and the external control device 200 can be prevented.

After the connection between the data input terminals Td3-Td0 and the external control device 200 is confirmed, a laser power control signal representing a specified digital data is provided to the data input terminals Td3-Td0. Then, the power of the laser beam emitted from the semiconductor laser LD can be adjusted to a proper amount corresponding to the laser power control signal by operating the variable resistor VR of the I/V converter 12.

After the adjustment of the power of the semiconductor laser LD is achieved, the laser scanning device 100 can be mounted into a laser printer, for example, and connected with an external controller such as a print engine thereof. If laser power control signal is provided from the print engine to the laser scanning device 100, the semiconductor laser LD emits a laser beam with a driving current Id properly corresponding to the laser power control signal being provided. Thus, the semiconductor laser LD will not be supplied with excessive current, which causes emission of an excessive power laser beam and hence serious damage to the semiconductor laser LD.

Figure 7:
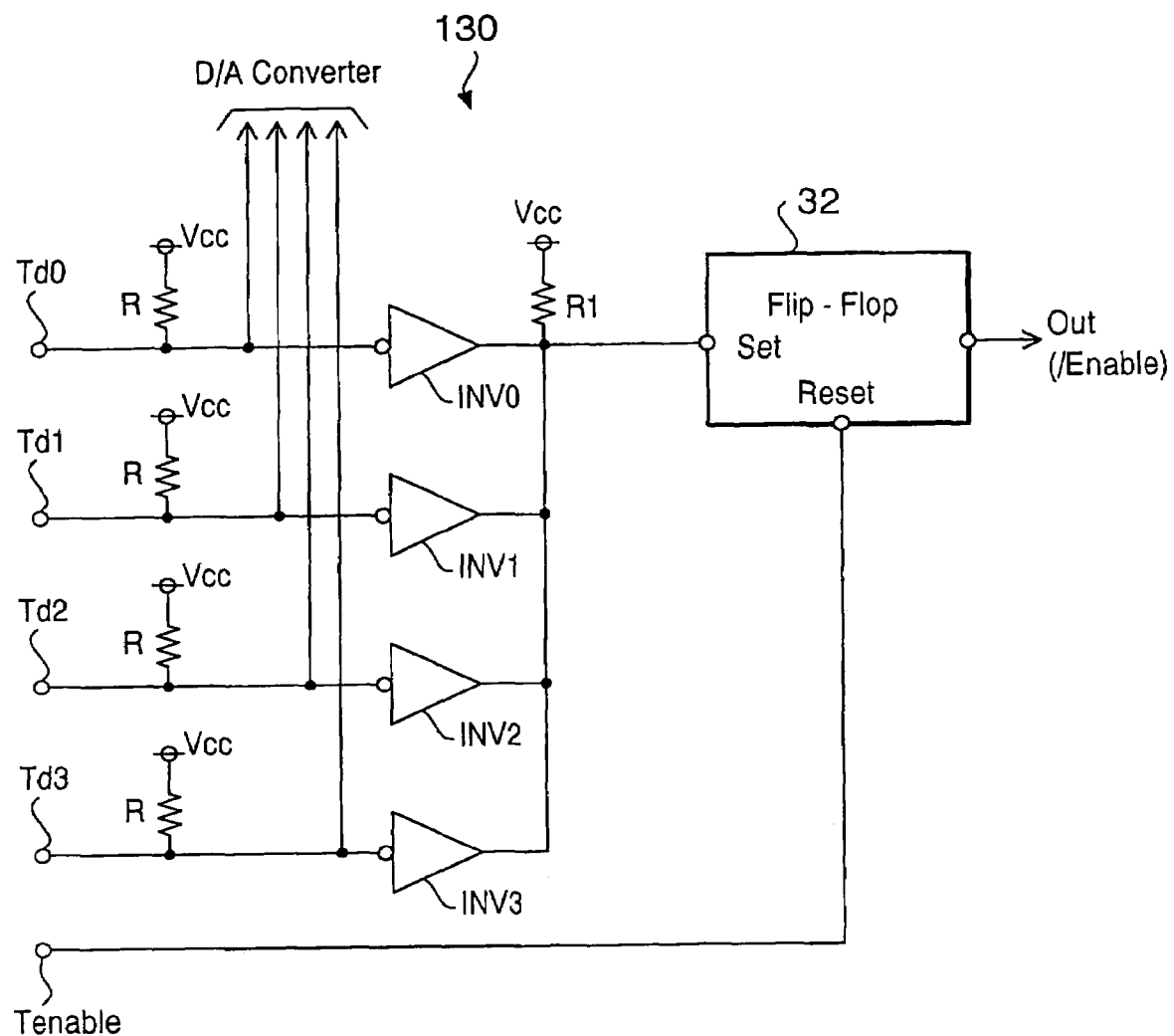
FIG. 7 shows a variation of an abnormal control signal detecting circuitry of the laser power control circuitry shown in FIG. 2.

FIG. 7 shows a variation of the abnormal control signal detecting circuitry 30. In the abnormal control signal detecting circuitry 130 shown in FIG. 7, the data input terminals Td3-Td0 are connected to four open-collector inverters INV3-INV0, respectively. The outputs of the inverters INV3-INV0 are connected so as to provide a wired-OR operation. The outputs of the inverters INV3-INV0 are also connected to a source voltage Vcc via a pull-up resistor R1 and to the Set input of the flip-flop 32.

In the abnormal control signal detecting circuitry 130 configured as above, the levels of the outputs of all inverters INV3-INV0, and hence the Set input of the flip-flop 32, become high, "H", only when all data input terminals Td3-Td0 are properly connected with the external control device 200 and provided with a laser power control signal "0000" which makes the voltage level of all data input terminals Td3-Td0 low, or "LLLL". As a result, the flip-flop 32 outputs a low level signal "L" to the laser driving circuitry 10 to allow the adjustment of the semiconductor laser driving current Id.

It should be noted that the abnormal control signal detecting circuitry 130 does not require any NAND gates like that shown in FIG. 3. Since in many integrated circuits, in which circuits are constructed by gate arrays, some gates (transistors) remain unused. The abnormal control signal detecting circuitry 130 can be made of open-collector inverters obtained by such unused transistors. Thus, the abnormal control signal detecting circuitry 130 is advantageous in integrating the laser power control circuitry 110.

Figure 8:
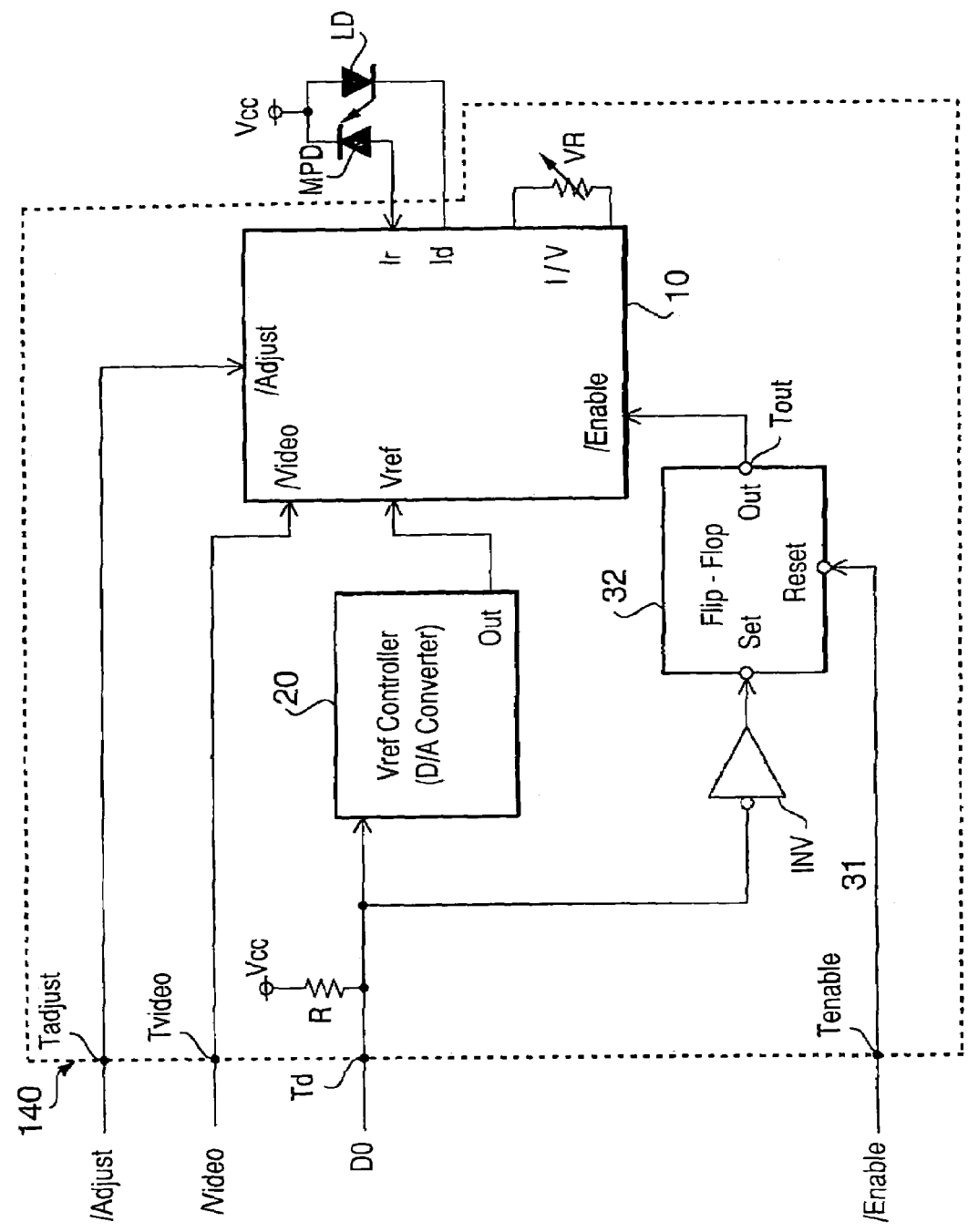
FIG. 8 shows a variation of the laser power control circuitry shown in FIG. 3.

FIG. 8 shows a variation of the laser power control circuitry 110 of FIG. 3. In the laser power control circuitry 140 shown in FIG. 8, the four input data terminals Td3-Td0 are replaced with a one bit serial data input terminal Td that is connected with the input of the reference voltage controller 20. The serial data input terminal Td is connected to a source voltage Vcc via a pull-up resistor R. Further, the serial data input terminal Td is connected with the Set input of the flip-flop 32 via an inverter INV.

In the laser power control circuitry 140 arranged as above, the connection of the serial data input terminal Td with the external control device 200 can be confirmed if the semiconductor laser LD emits the laser beam when data "0" is provided to the serial data input terminal Td from the external control device 200. More specifically, if the serial data input terminal Td is properly connected with the external control device 200, the inverter INV outputs a high level signal "H" to the flip-flop 32 when data "0" is provided to the serial input terminal Td. The flip-flop 32, in turn, outputs a low level signal to the laser driving circuitry 10 and allows it to operate. As a result, the semiconductor laser LD emits the laser beam. Thus, by checking whether the semiconductor laser LD emits the laser beam or not, the proper connection between the serial data input terminal Td and the external control device can be confirmed.

It should be noted that the D/A converter 20 utilized in the laser power control circuitry 140 is one with a serial/parallel converting function or one with a decoding function if the serial data is coded.

While the invention has been described in detail with reference to specific embodiments thereof, it would be apparent to those skilled in the art that various changes and modifications may be made therein without departing from the spirit of the invention, the scope of which is defined by the attached claims.

For example, although the data input terminals Td3-Td0 of the laser power control circuitry 110 are arranged to receive four bits parallel data, they may be arranged to receive parallel data of any bits, including eight bits parallel data and sixteen bits parallel data.

The present disclosure relates to the subject matter contained in Japanese Patent Application No. P2002-305892, filed on Oct. 21, 2002, which is expressly incorporated herein by reference in its entirety.

What is claimed is:

1. A laser scanning device, comprising:
   a semiconductor laser that emits a laser beam;
   a laser power detector that detects a laser beam power of said semiconductor laser;
   a reference voltage generator that generates a reference voltage for controlling the laser beam power of said semiconductor laser in accordance with a laser power control signal provided from an external device;
   a laser driver that compares the reference voltage generated by said reference voltage generator and the laser beam power detected by said laser power detector to control a driving current supplied to said semiconductor laser for emitting the laser beam; and
   an abnormal condition detector that detects, prior to emission of the laser beam, the laser power control signal received by said reference voltage generator and inhibits said laser driver from emitting the laser beam when the laser power control signal differs from a predetermined value, and that permits said laser driver to emit the laser beam when the laser power control signal is the same as the predetermined value,
   wherein said reference voltage generator has a plurality of input terminals, and said abnormal condition detector includes an NAND gate having a number of inputs that is not less than a number of said input terminals of said reference voltage generator.

2. The laser scanning device according to claim 1, wherein said laser driver has a manually operable adjuster for adjusting the driving current of said semiconductor laser so as to correspond to the laser power control signal.

3. The laser scanning device according to claim 1,
each of said plurality of input terminals being kept at a first voltage level when no laser power control signal is provided thereto, and
wherein said abnormal condition detector outputs a laser driver disable signal to said laser driver to stop operation thereof when at least one of said input terminals remains at the first voltage level and the laser power control signal inputted thereto has a second voltage level different from the first voltage level.

4. The laser scanning device according to claim 3, wherein the first voltage level is a high voltage and the second voltage level is a low voltage lower than the first voltage level.

5. The laser scanning device according to claim 3, wherein the laser power control signal is a parallel digital signal.

6. The laser scanning device according to claim 5,
wherein said abnormal condition detector includes an abnormal condition signal generator that generates an abnormal condition signal when at least one of said input terminals remains at the first voltage level and the laser power control signal inputted thereto has the second voltage level, and a laser driver controller that outputs the laser driver disable signal to said laser driver when said abnormal condition signal generator outputs the abnormal condition signal.

7. The laser scanning device according to claim 6, wherein said laser driver controller is a flip flop that changes a state of an output thereof to generate the laser driver disable signal.

8. A laser scanning device, comprising:
a laser source that emits a laser beam to scan an object;
a connector having at least one input terminal connectable to an external device for receiving a control signal;
a laser source controller that controls a power of the laser beam emitted from said laser source in accordance with the control signal received through said input terminal; and
a detector that, prior to emission of the laser beam, examines the connection between said input terminal and the external device and inhibits said laser source from emitting the laser beam when a poor connection between said input terminal and the external device is detected and that permits the laser source to emit the laser beam when a good connection between said input terminal and the external device is detected,
wherein said connector has more than two input terminals and said detector includes an NAND gate having a number of inputs that is not less than a number of said input terminals, and
wherein said inputs of the NAND gate are connected with respective ones of said input terminals.

9. The laser scanning device according to claim 8, wherein said laser source controller has an adjuster that adjusts the relation between the power of the laser beam and the control signal received.

10. The laser scanning device according to claim 8,
each of said input terminals being kept at a first voltage level when no control signal is provided thereto, and
wherein said detector disables said laser source from emitting the laser beam when at least one of said input terminals remains at the first voltage level and the control signal provided thereto has a second voltage level different from the first voltage level.

11. The laser scanning device according to claim 10,
wherein said detector includes an abnormal condition signal generator that generates an abnormal condition signal when at least one of said input terminals remains at the first voltage level and the laser power control signal inputted thereto has the second voltage level, and a disable signal generator that outputs a disable signal to said laser source controller when said abnormal condition signal generator outputs the abnormal condition signal, and
wherein said disable signal disables said laser source from emitting the laser beam.

12. The laser scanning device according to claim 11, wherein said laser driver controller is a flip flop that changes a state of an output thereof to generate the laser driver disable signal.

13. A laser scanning device, comprising:
a laser source that emits a laser beam to scan an object;
an input terminal connectable to an external device for receiving a control signal;
a laser source controller that controls a power of the laser beam emitted from said laser source in accordance with the control signal received through said input terminal, said laser source controller having an adjuster that adjusts a relation between the power of the laser beam and the control signal received; and
a detector that, prior to emission of he laser beam, examines the connection between said input terminal and the external device and inhibits said adjuster from operating when a poor connection between said input terminal and the external device is detected and that permits the adjuster to operate when a good connection between said input terminal and said external device is detected,
wherein said input terminal comprises more than two input terminals, wherein said detector includes an NAND gate having a number of inputs that is not less than a number of said input terminals, and
wherein said inputs of the NAND gate are connected with respective ones of said input terminals.

14. The laser scanning device according to claim 13,
each of said input terminals being kept at a first voltage level when no control signal is provided thereto, and
wherein said detector disables said adjuster from operating when at least one of said input terminals remains at the first voltage level and the control signal provided thereto has a second voltage level different from the first voltage level.

* * * * *